United States Patent

Hutchison

Patent Number: 6,112,825
Date of Patent: Sep. 5, 2000

[54] MOUNTING SYSTEM FOR CUTTING HEAD

[75] Inventor: Marion Hutchison, Marietta, Ga.

[73] Assignee: Turf Products Corp., Marietta, Ga.

[21] Appl. No.: 09/330,327

[22] Filed: Jun. 11, 1999

Related U.S. Application Data

[60] Provisional application No. 60/090,229, Jun. 22, 1998.

[51] Int. Cl.⁷ .................................................. A01B 45/04
[52] U.S. Cl. ............................................................... 172/19
[58] Field of Search ............................. 172/19, 20, 41, 172/42, 17, 13, 15, 16

[56] References Cited

U.S. PATENT DOCUMENTS

| | | | |
|---|---|---|---|
| 2,506,371 | 5/1950 | Lint | 172/19 |
| 3,469,635 | 9/1969 | Hartl | 172/19 |
| 4,049,060 | 9/1977 | Hoke | 172/19 |
| 4,934,464 | 6/1990 | Shields | 172/19 |
| 5,170,848 | 12/1992 | Walton | 172/19 |

*Primary Examiner*—Christopher J. Novosad
*Attorney, Agent, or Firm*—Dean P. Edmundson

[57] ABSTRACT

Sod harvesting equipment is described which includes a cutting head with an undercutting knife and side rollers or knives. The cutting head is mounted such that it can tilt or rotate about an axis of rotation extending through the plane of the undercutting knife. The bearing arrangement eliminates the need for the undercutting knife to move sideways as the head progresses over uneven ground. The gage roller and the cutting head are allowed to work in complete conformance with the surface encountered to minimize scalping due to uneven terrain.

3 Claims, 5 Drawing Sheets

MOUNTING SYSTEM FOR CUTTING HEAD

CROSS-REFERENCE TO RELATED APPLICATION

This application is based upon, and claims priority from, my copending provisional application Ser. No. 60/090,229, filed Jun. 22, 1998.

FIELD OF THE INVENTION

This invention relates to sod harvesting equipment. More particularly, this invention relates to improvements to sod harvesting equipment. Even more particularly, this invention relates to improvements to the manner of mounting the cutting head to the harvesting machine to control uniformity in the thickness of the sod strips being harvested.

BACKGROUND OF THE INVENTION

Sod harvesting machines have been commercially available for a long time and are generally designed as a self-propelled machine or as a cutting unit which can be attached to a conventional tractor. The cutting head includes (a) a generally-horizontal knife to undercut the sod at a specified depth, and (b) side cutting blades at opposite ends of the horizontal knife to cut the edges of a sod strip. A roller can be included forwardly of the knife on a horizontal axis to support the weight of the cutting head and establish the thickness of the sod strip.

One problem with conventional sod harvesters or sod cutting heads which are rigidly mounted to the tractor or driving implement is that the cutting head does not follow the contour of the ground closely enough to assure that the cut sod strip will be of a uniform thickness from side-to-side as the harvester moves across the field.

An improved sod harvester is described in U.S. Pat. No. 4,621,696 in which a sod cutting head is pivotally mounted to a fixed frame by a horizontal front pivot shaft and by a pair of rear pivots. As the gage roller tilts to the left or to the right when following the contour of the ground, the cutting knife and side rollers or knives must also swing to the left or to the right by a distance proportional to the degree of rotation and the normal distance from the lower edge of the gage roller to the axis of rotation of the cutting head. Such sideways movement is usually prevented because of the side restraining effect of the side rollers or knives and the short distance between undulations. The result is that the sod strip tends to vary in thickness across its width, sometimes to the extent that the strip is less than zero in thickness on one side. Extreme variation in thickness across the width of the sod strip is referred to as "scalping".

There has not heretofore been provided a sod harvesting apparatus which effectively minimizes the problem of non-uniform sod cutting.

SUMMARY OF THE INVENTION

In accordance with the present invention there is provided an improved sod harvesting apparatus in which the cutting head is mounted such that independent rotary movement of the head is permitted for cutting a sod strip. A bearing arrangement for the cutting head comprises two bearings which are mounted beneath the conveyor near the lower (i.e., forward) end. The bearings may be secured to either the conveyor or to the cutting head, with the bearing pivot then being fixed to the other rotating portion. Of course, the mounting system of this invention may be utilized on sod harvesters whether or not the harvester includes a conveyor.

In the present invention, the two pivot points are located rearwardly of the cutting head. The axis of rotation of the cutting head passes through the working point of the undercutting knife.

Thus, the bearing arrangement of the invention eliminates the need for the undercutting knife to move sideways as the head progresses over uneven ground. In this manner, the gage roller and cutting head are allowed to work in complete conformance with the surface encountered, and scalping due to uneven terrain is essentially reduced to zero.

Other features and advantages of the apparatus of the invention will be apparent from the following detailed description and the accompanying drawings.

BRIEF DESCRIPTION OF THE DRAWINGS

The invention is described in more detail hereinafter with reference to the accompanying drawings in which.

DETAILED DESCRIPTION OF THE INVENTION

The sod harvesting apparatus of the present invention provides a cutting head assembly which enables the undercutting knife and the side rollers or knives to closely follow the contour of the sod surface in a manner such that scalping of the sod is avoided. The cutting head is mounted on the apparatus such that the axis of rotation of the cutting head passes through the plane of the undercutting knife. Thus, when the cutting head encounters normal ground undulations, it is able to tilt or rotate from side-to-side while maintaining a uniform thickness of the sod being cut.

Figure 1:
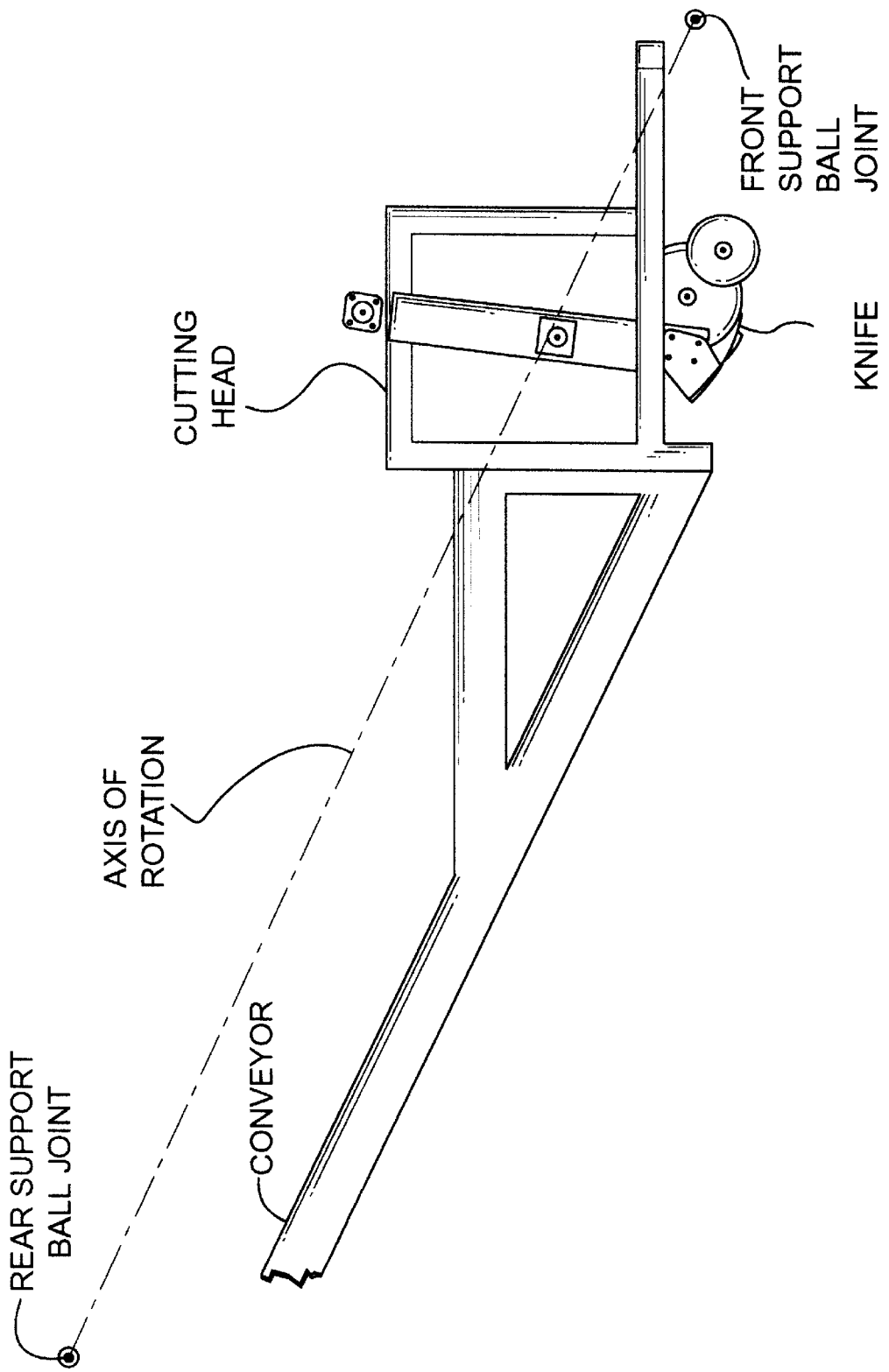
FIG. 1 is a side elevational view of a "standard" or conventional sod harvester.

FIG. 1 is a side view of a conventional or standard sod cutting apparatus in which the conveyor and cutting head are combined with a single welded frame which is attached to a tractor at two points (front and rear support ball joints). The rear support ball joint furnishes the drive force supplied by the tractor. The front support ball joint is attached to a "track rod" which is a tubular strut with the opposite end attached to a ball joint at about the center of the tractor. The front ball joint is allowed to move vertically but is constrained laterally. The "axis of rotation" is generally a straight line through the two ball joints. The radius of rotation is a distance normal to the axis of rotation and extending to the bottom of the gage roller (about 13 inches).

Figure 2:
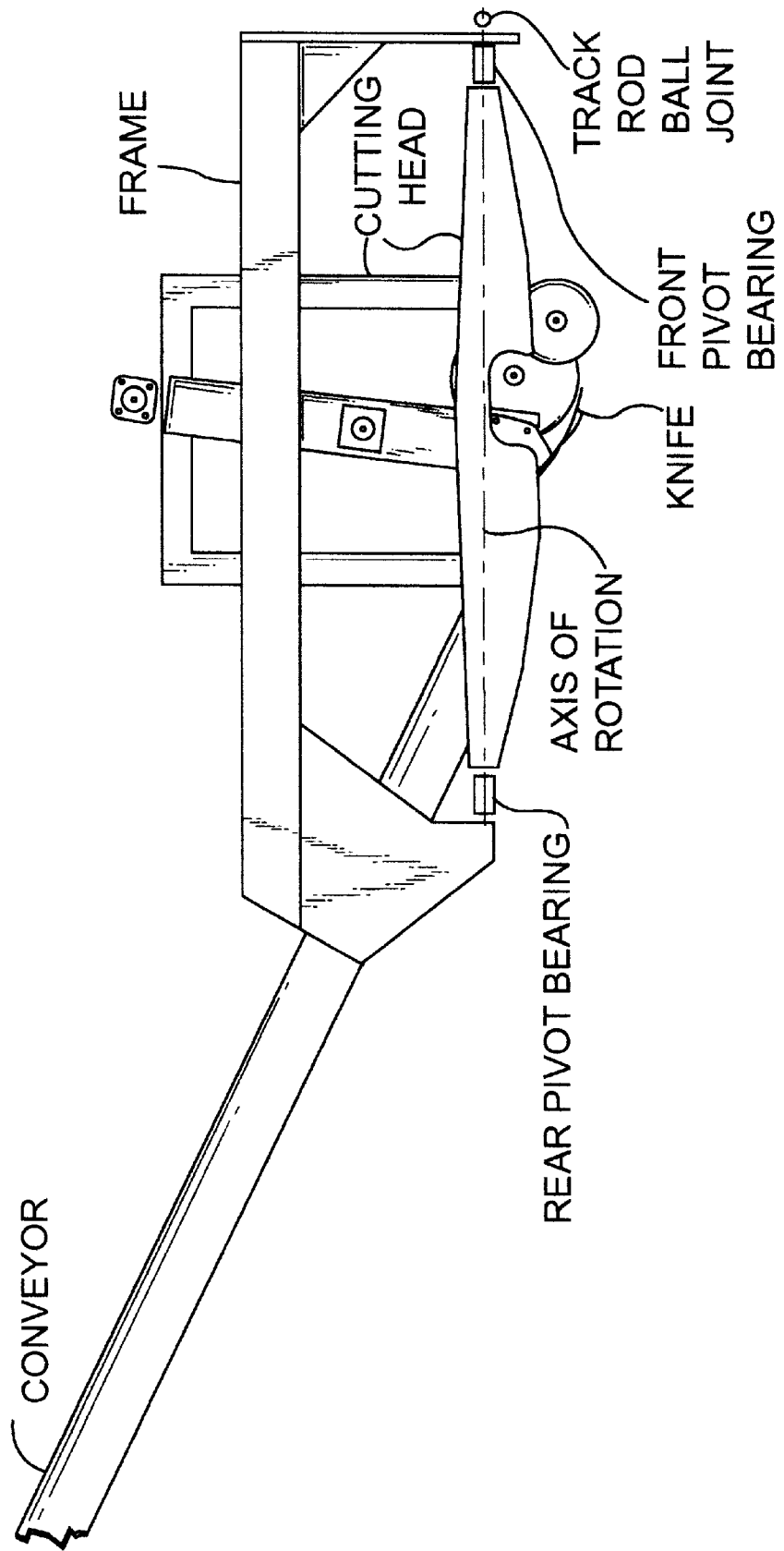
FIG. 2 is a side elevational view of a commercially-available "floating head" harvester.

FIG. 2 is a side view of a "floating head" harvester (e.g., Brouwer 1560). The conveyor is combined with a frame extension which extends forward of the cutting head. This conveyor extension is attached to the tractor by means of a track rod ball joint similar to a standard harvester. At the upper rear of the conveyor is a drive point consisting of a horizontal pivot which allows the cutting head to be lifted when not in use, but which restricts any rolling action. Front and rear pivot bearings support the cutting head within the conveyor frame and its extension. The axis of rotation of the cutting head is thus several inches above the lower edge of the undercutting knife.

Figure 3:
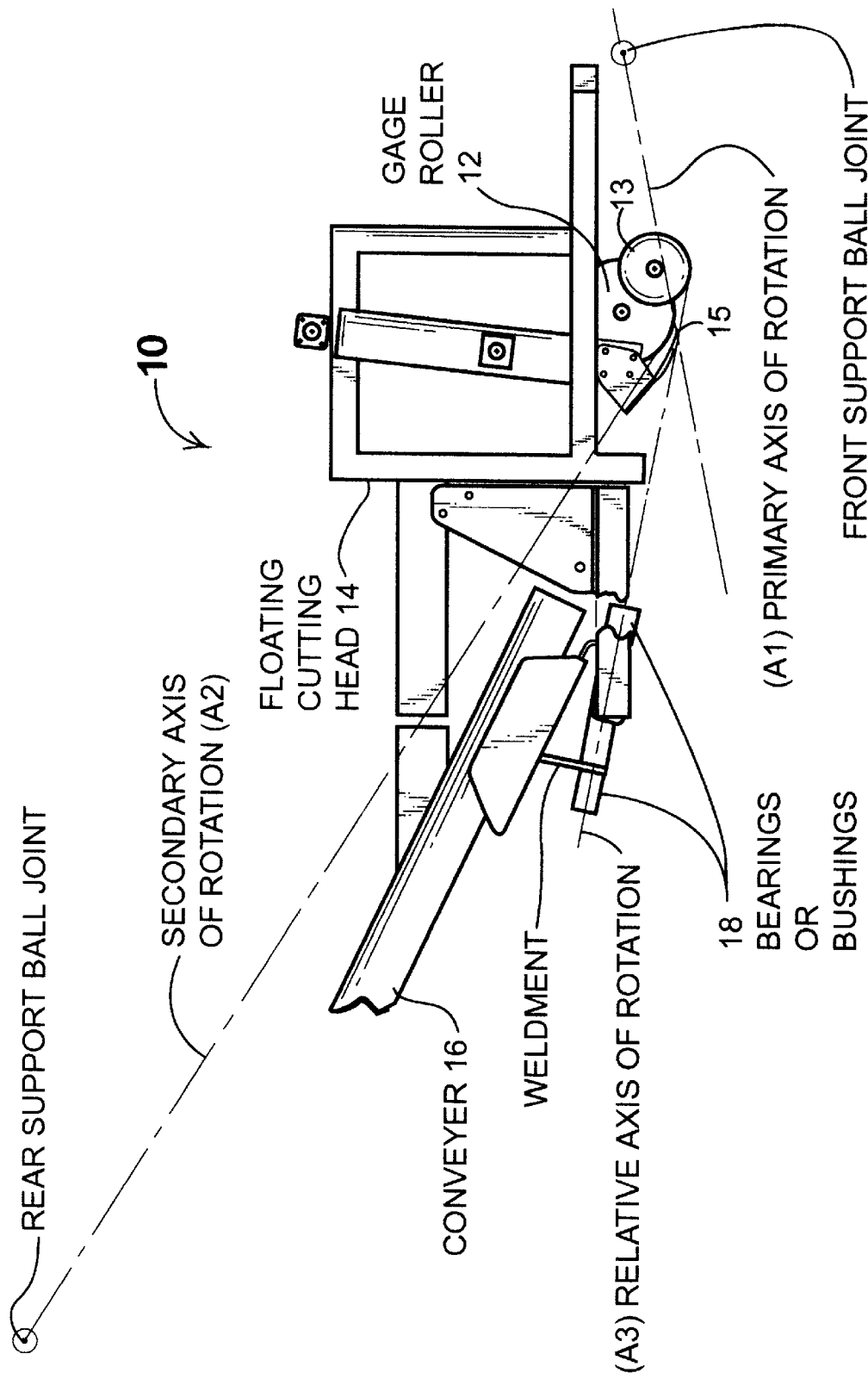
FIG. 3 is a side elevational view of sod harvesting apparatus of this invention.

FIG. 3 is a side view of the apparatus 10 of the invention. The primary and secondary axes of rotation (A1 and A2) intersect at the bottom of the gage roller 12. The cutting head 14 (with knife 15) and the conveyor 16 are coupled by two elastic bushings 18 whose mutual centerline approximately bisects the primary and secondary axes of rotation. As the cutting head rolls about the primary axis, the corresponding movement required of the conveyor is accommodated at the relative axis of rotation (A3).

The elastic bushings used in the apparatus have a torsional spring rate of 100 lb./in. per degree and a radial spring rate of 105,000 lb./in. They are commercially available.

Figure 4:
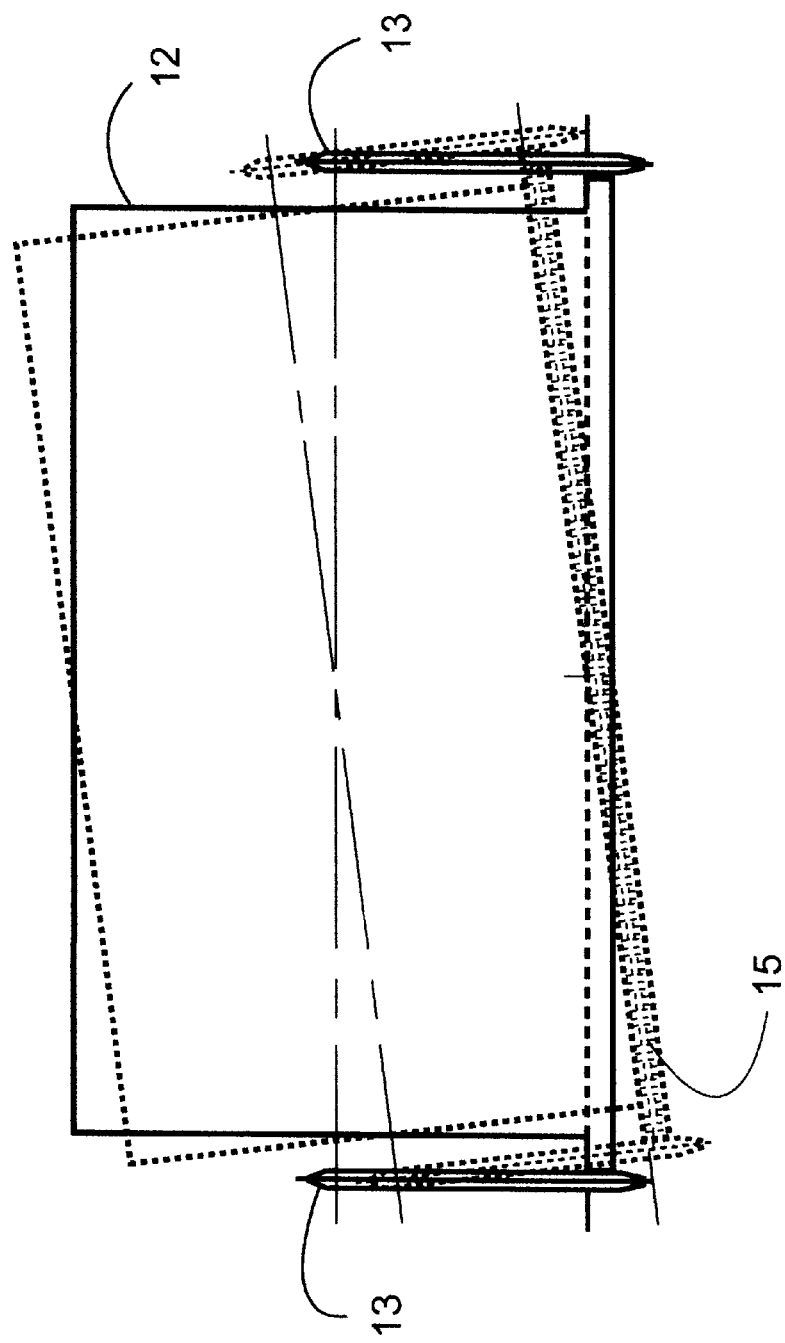
FIG. 4 is a front elevational view of the apparatus of FIG. 3 when encountering a six degree ground undulation.

FIG. 4 shows that the cutting head of the invention is able to tilt or rotate from side-to-side without having to laterally displace the side cutting rollers or knives 13.

Figure 5:
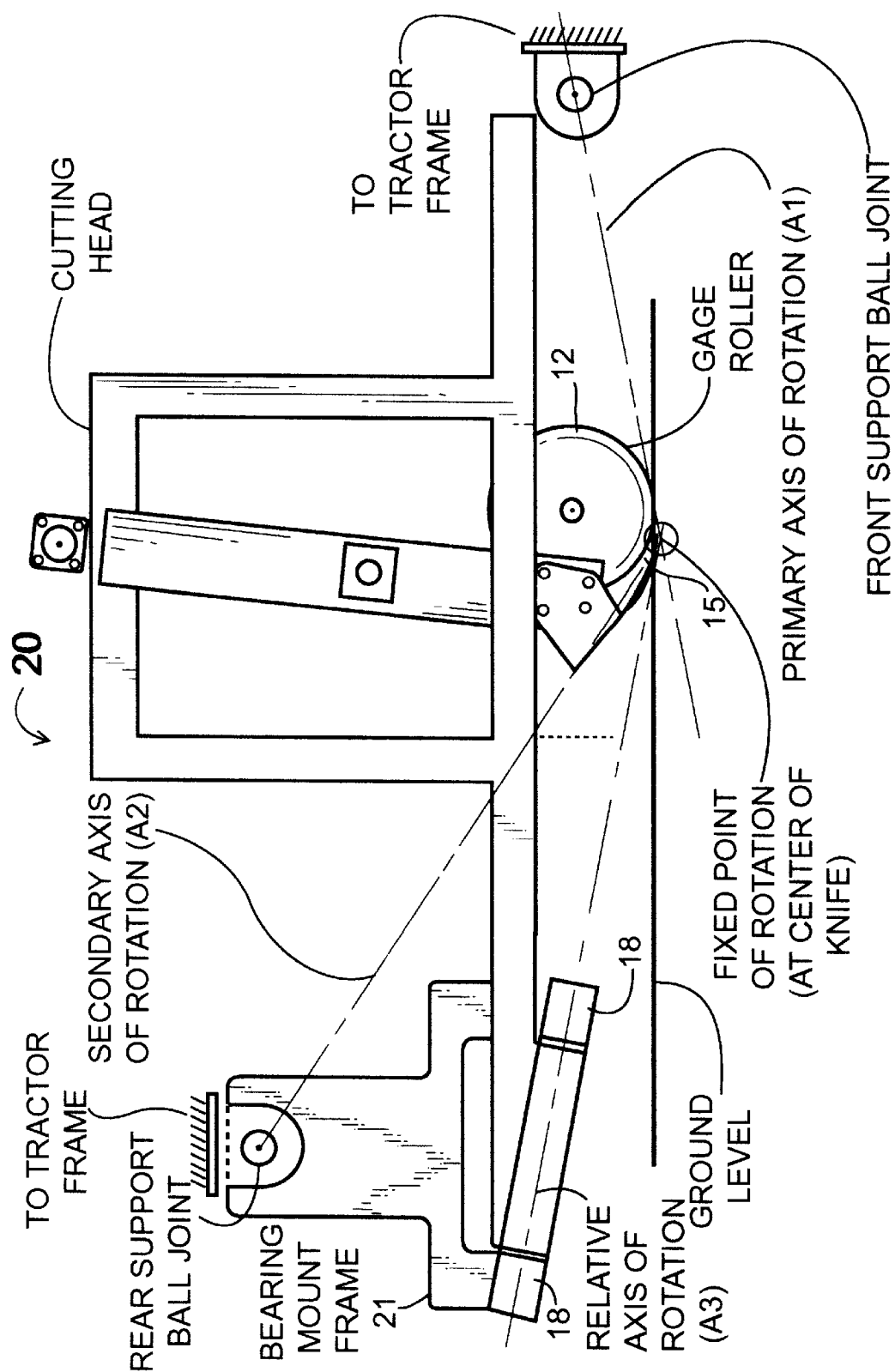
FIG. 5 is a side elevational view of another embodiment of sod harvesting apparatus of the invention.

FIG. 5 shows another embodiment of sod harvester apparatus 20 of the invention. This apparatus does not include a conveyor. The bearing mounting frame 21 is secured to the frame of the tractor rearwardly of the undercutting knife 15. The relative axis of rotation A3 passes through bearings 18 and intersects with the center of the lower edge of the cutting blade, as illustrated.

Thus, in the apparatus of the invention, the cutting head is permitted to float so that it can follow the contour of the sod surface and provide sod cutting with essentially uniform thickness. In understanding the ability of the apparatus to allow the desired conformance to ground contour without requiring side-to-side movement of the edge cutting means, it is useful to view the primary and sceondary axes of rotation (FIGS. 3 and 5) as being analogous to the centerlines of two rotating shafts, each being furnished with a bevel gear, with the gears being in mesh with each other. The mesh line of these two bevel gears is represented by the relative axis of rotation. It will be understood that if the three rotational centerlines coincide at a common point, in this case the center of the cutting plane, then no lateral motion will occur as rotation of the two shafts occurs.

Other variants are possible without departing from the scope of the invention.

What is claimed is:

1. In a sod harvesting machine powered by a tractor and including a cutting head with an elongated undercutting knife and side rollers or knives, wherein said undercutting knife includes a cutting edge having a center, said sod harvesting machine further including a conveyor rearwardly of said cutting head, the improvement which comprises means for mounting said cutting head such that said cutting head can tilt or rotate about an axis of rotation extending through said center of said cutting edge of said undercutting knife; wherein said axis of rotation is perpendicular to said cutting edge.

2. The improvement in accordance with claim 1, wherein said cutting head is supported by means of bearings positioned rearwardly of said undercutting knife.

3. The improvement in accordance with claim 2, wherein said bearings are carried by said machine, and wherein said cutting head comprises a frame which is supported by said bearings.

* * * * *